United States Patent [19]

Mian

[11] 4,141,656

[45] Feb. 27, 1979

[54] METHOD AND APPARATUS FOR WETTING AND MIXING DRY POWDERS OR PARTICLES WITH A WETTING AGENT

[76] Inventor: Tuaha Mian, 1224 E. Algonquin Rd., Schaumburg, Ill. 60195

[21] Appl. No.: 884,002

[22] Filed: Mar. 6, 1978

[51] Int. Cl.$^{2}$ .............................................. G05D 11/00

[52] U.S. Cl. ...................................... 366/160; 366/162

[58] Field of Search ............... 366/160, 161, 162, 241, 366/244, 245, 247, 279, 282, 341, 348, 601

[56] References Cited

U.S. PATENT DOCUMENTS

| | | | |
|---|---|---|---|
| Re. 27,681 | 6/1973 | Gaddis | 259/18 |
| 2,161,342 | 6/1939 | Francis | 221/120 |
| 2,980,290 | 4/1961 | Fahrni | 222/1 |
| 3,147,955 | 9/1964 | Harvey | 259/4 |
| 3,164,443 | 1/1965 | Watson | 23/267 |
| 3,697,052 | 10/1972 | Andris | 366/162 |
| 3,814,388 | 6/1974 | Jakob | 366/161 |
| 3,995,838 | 12/1976 | Zucker | 366/160 |

*Primary Examiner*—Edward J. McCarthy

[57] ABSTRACT

A method and apparatus for mixing dry powder or particles with a wetting agent so as to prepare a homogenous liquid solution. The dry powder or particles are initially wetted by pulverization with streams of the wetting agent prior to being mixed in a mixing system. The mixing system permits the agitation and aging of the mixture into a homogenous liquid solution.

10 Claims, 7 Drawing Figures

Fig. 1.
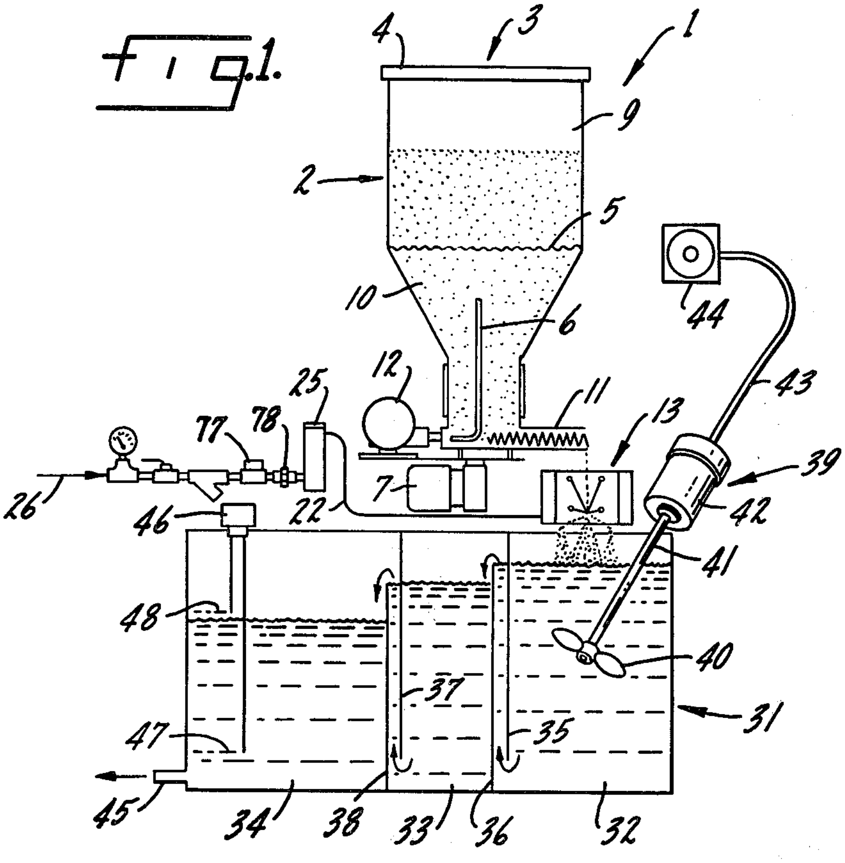
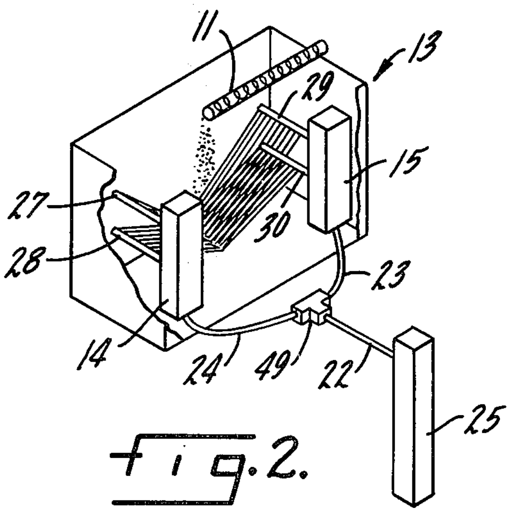
Fig. 2.

Fig. 3.
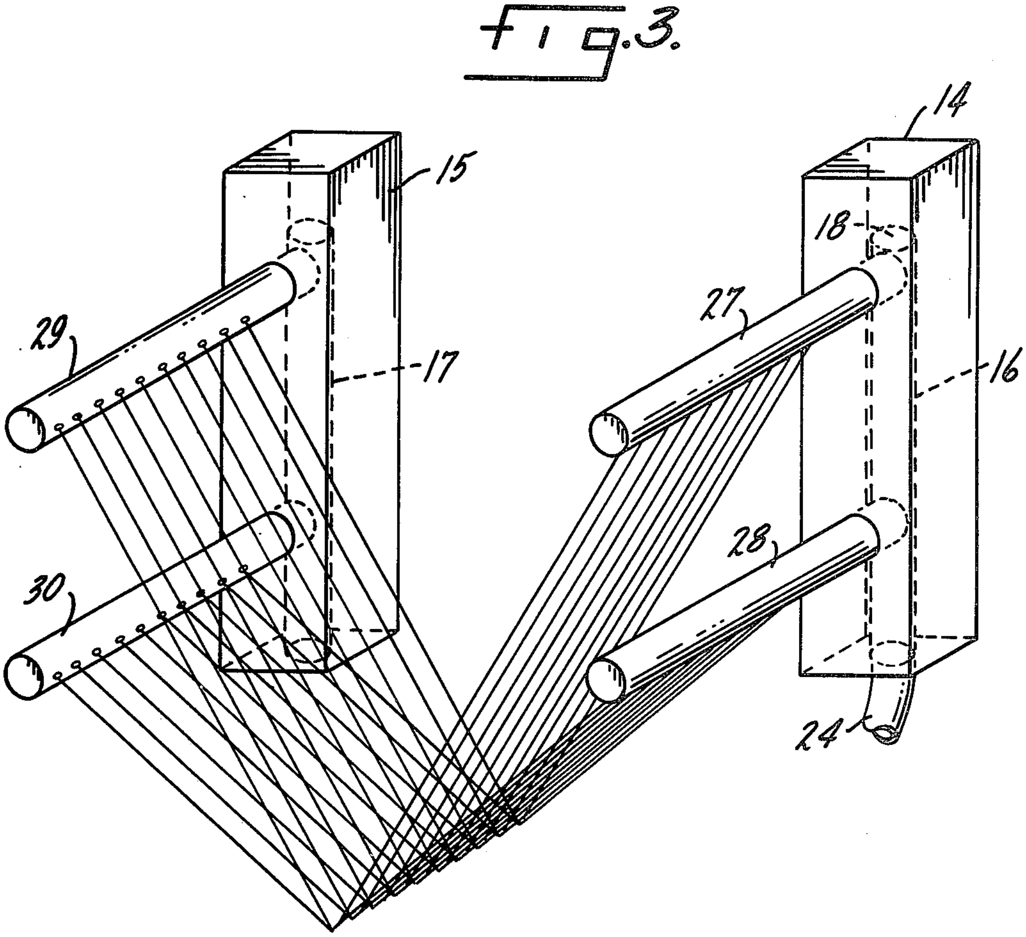
Fig. 4.
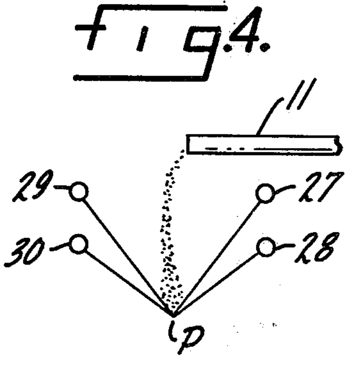
Fig. 5.
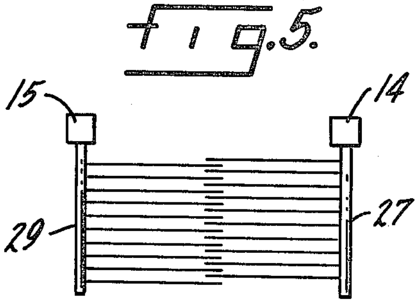
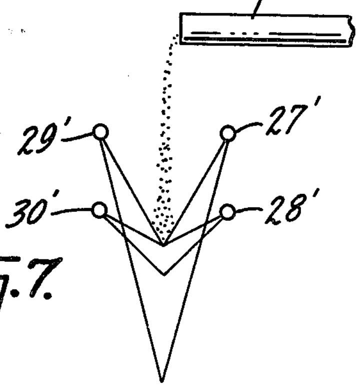
Fig. 7.
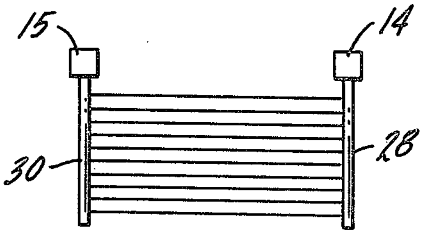
Fig. 6.

METHOD AND APPARATUS FOR WETTING AND MIXING DRY POWDERS OR PARTICLES WITH A WETTING AGENT

This invention relates generally to the art of mixing, and specifically to the mixing of dry solid particles with a wetting agent so as to dissolve the particles in the wetting agent and thereby prepare a homogenous liquid solution.

BACKGROUND OF THE INVENTION

Various methods and apparatus for mixing dry particles or dry bulk materials, such as polyelectrolytes and the like, with a wetting agent, such as water, have been proposed. However, all such methods and apparatus have had disadvantages, particularly in failing to provide for the adequate and complete dissolution of the dry particles into the wetting agent to prepare a homogenous liquid solution. It is a well-known characteristic of dry powders and like dry particles that agglomeration occurs when such powders or particles initially come into contact with a wetting agent. These agglomerations limit the access of the wetting agent to the particles located on the interior of the agglomerations and thus preclude the complete dissolution of all of the particles so that a homogenous liquid solution can be prepared.

SUMMARY OF THE INVENTION

Accordingly, it is a primary object of this invention to provide a method and apparatus for mixing dry particles with a wetting agent so as to eliminate agglomeration of the particles and provide for complete dissolution of the particles into the wetting agent so as to yield a homogenous liquid solution.

Another important object of this invention is to provide a method and apparatus for discharging dry particles from a storage zone so that the particles are permitted to free fall into a wetting zone where the particles are wetted prior to being mixed with a wetting agent into a homogenous mixture.

A further object of this invention is to provide a method and apparatus for wetting free-falling dry particles with a wetting agent by directing solid streams of the wetting agent at the particles during free fall thereof in such manner as to effectively separate the particles and cause each individual particle to become encircled by the wetting agent and thereby eliminate agglomeration of the particles.

Another object of this invention is to provide a method and apparatus for wetting free-falling dry particles with a wetting agent in such a manner that atomizing and splashing of the wetting agent is eliminated, and thereby agglomeration of the dry particles is minimized or eliminated.

Another object of this invention is to provide a method and apparatus for effectively mixing wetted particles by agitating a viscous mixture of wetted particles and thereafter permitting the mixture to age so as to provide for complete dissolution of the wetted particles into a homogenous liquid solution.

Yet another object of this invention is to provide a method and apparatus for automatically controlling the mixing of dry particles with a wetting agent so as to yield a homogenous liquid solution.

Other objects and advantages will be apparent from the following description of the invention.

The invention is illustrated more or less diagramatically in the accompanying drawing wherein:

FIG. 1 is an elevation view, partly schematic in nature, of the wetting and mixing system of the invention;

FIG. 2 is a schematic, perspective view of the wetting zone of the invention;

FIG. 3 is a perspective view of the wetting zone of the invention taken to a larger scale than FIG. 2;

FIG. 4 is a diagramatic view of the wetting zone of the invention;

FIG. 5 is a top view of the top headers from which the wetting agent is directed in the wetting zone of the invention;

FIG. 6 is a bottom view of the bottom headers from which the wetting agent is directed in the wetting zone of the invention; and FIG. 7 is a diagramatic view of the wetting zone of the invention in an alternate embodiment.

Like reference numerals will be used to refer to like parts from figure to figure of the drawing.

FIG. 1 shows a diagramatic view of the wetting and mixing systems of the invention.

The wetting and mixing system of the invention includes a feeding system, indicated generally at 1 in FIG. 1, for storing and discharging the dry powder or particles which are to be mixed with the wetting agent.

In a preferred embodiment, the feeding system comprises a storage hopper, indicated generally at 2, which has a tank section 9 and funnel section 10. The storage hopper is supplied through a hinged or removable lid indicated generally at 3 having a seal 4. At the center region of the hopper dividing the tank section from the funnel section is a suitably webbed screen 5 which permits the particles to gravitate through the screen and accumulate in the funnel section of the hopper.

An agitator rod 6, mounted on a conventional vibrator unit 7 which is laterally remotely located with respect to the funnel section of the hopper, extends into one side of the hopper and is disposed substantially vertically, and in substantially axial alignment with, the longitudinal axis of the hopper. It can be seen that suitable vibration of the agitator rod causes the further gravitation of the particles out of the hopper through discharge tube 11 thereby permitting the particles to issue from the discharge tube at a substantially uniform velocity so that they will follow a relatively fixed free-fall flow path. It will be further appreciated that the quantity of particles discharged from the hopper through the discharge tube can be automatically regulated and pre-set by means of adjusting the speed of a conventional feeder drive 12 of the vibrator unit.

It will be noted that the discharged particles free-fall from discharge tube 11 into the wetting zone of the invention, indicated generally at 13, where the particles are initially wetted with the wetting agent so as to effectively minimize the formation of insoluble agglomerates in the mixture.

In a preferred embodiment, the wetting agent is directed into the wetting zone from a wetting agent supply source 26 by automatic flow control means which includes conventional solenoid valve 77, flow controller assembly 78, and flow meter 25.

From FIG. 2, it will be noted that the wetting agent flows through the flow meter 25 into the wetting zone via flexible tubes 22, 23, and 24 which are interconnected with a tee 49 which directs the flow into tubes 23 and 24.

The wetting zone is further exemplified in FIG. 3 and, in a preferred embodiment, includes two substantially rectangular manifolds 14 and 15 constructed of a stable material such as steel or plastic, each of which has a longitudinal chamber 16 and 17, respectively.

With respect to manifold 14, it will be noted that chamber 16 is oriented about the longitudinal axis of the manifold and extends from an uppermost point 18 to the base of the manifold where tube 24 is connected by conventional means.

It will be noted that the corresponding elements of manifold 15 are identically arranged with respect to each other.

Each manifold assembly includes two parallel horizontally oriented chambers which communicate with the longitudinal chamber, the outside diameter of the uppermost horizontal chamber being located near the upper end portion of the longitudinal chamber. In one embodiment, horizontal chambers within each post are separated by an approximate distance of 1½ inches from center to center.

Headers 27, 28, 29, and 30 are constructed of a similar stable material and have, in this instance, approximately ten holes, 1/16-inch diameter, the distance between each hole being approximately 3/32-inches from center to center, and in communication with the respective horizontal chambers of the manifold. Accordingly, it can be seen that the wetting agent under pressure in the longitudinal chamber of the manifold will form solid streams through the holes in headers 27, 28, 29, and 30. With respect to a particular header, such as header 27, for example, it will further be noted that the individual streams of wetting agent directed therefrom form a plane.

In particular, as shown in FIG. 4, it will be understood that the planes of wetting agent directed from the headers intersect along a common line P, which line also intersects the path of the free-falling particles discharged from discharge tube 11. These streams of wetting agent pulverize the free-falling dry particles so as to effectively separate the individual particles from each other and cause the complete encirclement of each individual particle with the liquid wetting agent which, in turn, provides for the ultimate dissolution of the particles in the mixture.

In a preferred embodiment of the configuration of the planes of wetting agent generated from headers 27, 28, 29, and 30, the headers protruding from the respective manifolds 14 and 15 are separated by a distance of approximately 3 inches. With respect to top headers 27 and 29, the corresponding solid streams of wetting agent directed therefrom are staggered so that the streams do not meet each other face to face as shown in FIG. 5. This eliminates atomizing and splashing of the wetting agent in the uppermost region of the wetting zone, and thereby eliminates agglomeration of the particles near discharge tube 11. A preferable angle formed between the planes of wetting agent directed from headers 27 and 29 and the horizontal may range from 45° to 70°. With respect to the corresponding solid streams of wetting agent generated from bottom headers 28 and 30, these streams intersect each other as shown in FIG. 6. The intersection of these streams causes a maximum pulverization of the free-falling particles which effectively separates the individual particles from each other to permit maximum dissolution. A preferable angle formed between the planes of wetting agent directed from headers 28 and 30 and the horizontal may range from 30° to 55°.

It can be readily appreciated from the configuration of the planes of the wetting agent that the dry particles will continue to fall substantially vertically into the mixing zone after being wetted along line P due to the substantially equivalent forces generated on either side of line P.

In an alternate embodiment of the wetting system of the invention such as shown in FIG. 7, the streams of wetting agent directed from a particular header, such as header 27, for example, may form a plurality of planes which intersect the path of the free-falling particles to further increase their separation. Such an embodiment is especially adaptable for use where the nature or volume of the dry particles to be mixed is such that increased separation of the particles is needed.

Although several preferred embodiments of the wetting system have been shown, it will be appreciated that increased sepation of the free-falling dry particles may also be achieved by incorporating additional headers into the manifolds so that additional streams may be directed toward the flow path of the particles.

The mixing system of the invention, indicated generally at 31 in FIG. 1, is comprised of a conventional mixing tank having three separate zones which are laterally oriented with respect to each other. The mixing tank includes a mixing zone 32, an aging zone 33, and a supply zone 34. Baffles 35 and 36 divide the mixing zone from the aging zone and baffles 37 and 38 divide the aging zone from the supply zone.

It will be readily understood that the free-falling wetted particles are allowed to fall substantially vertically into the center of the mixing zone where they accumulate into a mixture which is substantially insoluble. The substantially vertical path of the free-falling wetted particles into the center of the mixing zone eliminates agglomeration of the particles on the walls of the mixing zone. An auxiliary mechanical mixing means, indicated generally at 39, is provided to agitate the mixture so as to further increase the dissolution of the particles in the mixture so as to transform the mixture into a homogenous liquid solution.

In a preferred embodiment, the auxiliary mechanical mixing means is comprised of a conventional propeller means 40 mounted on the terminal end of shaft 41 submerged within the mixture. The other terminal end of shaft 41 is connected to a motor 42 which causes the rotation of the shaft and the corresponding rotation of the propeller mounted thereon which agitates the mixture in the mixing zone. Motor 42 is connected by lead 43 to timing device 44 in order to permit the pre-setting of the agitation source so that it may continue to agitate the mixture independently of the input of wetted particles into the mixing system.

It will be understood that the substantially insoluble mixture in the mixing zone is caused by its relative high density to be transferred into the aging zone through underflow baffle 35 and overflow baffle 36 and then into the supply zone through underflow baffle 37 and overflow baffle 38. Baffles 35, 36, 37, and 38 are suitably arranged to permit an aging process to occur during this transferral of the mixture so that the particles are allowed to reach full activity when eventually removed from the supply zone through outlet 45.

The automatic controlling system of the invention is regulated by level control device 46 which is installed in the supply zone. The level control device is preset so as to automatically engage vibrator unit 7, solenoid valve 77, and agitation source 42 when the level of the mixture in the supply zone falls below a pre-determined suitable level shown at 47. Correspondingly, the level control device automatically disengages vibration unit 7 and solenoid valve 24 and simultaneously engages timing device 44 when the level of the mixture in the supply zone rises to a predetermined suitable level shown at 48. Accordingly, the operation of the mixing system is automatically regulated in accordance with the level of the mixture in the supply zone, which level ranges between points 47 and 48.

In summary, it will be appreciated from the embodiment of the wetting system of the invention described that agglomeration of the dry particles is eliminated in several key respects. The configuration of the solid streams of wetting agent eliminates atomization in the upper region of the wetting zone so as to prevent agglomeration occuring on or near the discharge tube. Further, the substantially equivalent forces created by the streams of wetting agent on either side of the flow path of the free-falling particles permit the particles to fall in a substantially vertical direction into the center of the mixing zone so as to prevent agglomeration occurring near the walls of the mixing zone. In addition, these forces caused by the streams of wetting agent effectively separate the individual particles from each other so as to provide for their ultimate complete dissolution.

It will also be appreciated that the following polyelectrolytes are especially suitable for use with this invention:

acrylamide-acrylic copolymer
acrylamide-acrylic acid copolymer sodium salt (AA-AM copolymer)
hydrolyzed acrylate-vinyl alcohol copolymer
copolymer of methyl acrylate (MA)/vinyl acetate (VA)
water-soluble copyolymers of N-vinyl pyridine
aminoalkyl acrylates
methacrylates
meleates
aminoalkyl acrylamides
methacrylamides
acrylic acid-acrylamide copolymers
alkali-hydrolyzed polyacrylamides
acid-hydrolyzed polyacrylonitriles
acrylamide-sodium vinyl sulfonate copolymer
acrylamide-sodium solfopropyl acrylate copolymer
methacrylic acid and cyclized dimethacryloylimide
vinylchloroacetate polymers
vinyl-maleic anhydride polymer Although a preferred embodiment of the invention has been illustrated and described, it will at once be apparent to those skilled in the art that modifications and betterments of the invention may be made within the spirit and scope of the inventive concept. It is intended that the scope of the invention be limited not by the scope of the foregoing exemplary description, but, rather by the hereinafter appended claims when interpreted in light of the pertinent prior art.

What is claimed is:

1. In a apparatus for mixing solid dry particles with a wetting agent, the combination of:

means for feeding said particles from a storage zone into a wetting zone so as to enable said particles to free-fall from said storage zone into said wetting zone;

means for wetting said particles in said wetting zone, said wetting means including means for directing streams of said wetting agent at said particles to separate said particles from each other and permit said wetted particles to free-fall into a mixing zone;

means for mixing said wetted particles with said wetting agent into a mixture in said mixing zone;

means for transferring said mixture from said mixing zone into an aging zone and then into a supply zone, said transferring means permitting an aging of said mixture which increases the homogeneity of said mixture and the dissolution of agglomerates in said mixture.

2. The apparatus for mixing solid dry particles with a wetting agent of claim 1, further characterized by and including means for automatically controlling the quantity of said particles fed into said mixing zone simultaneously with the quantity of said wetting agent being wetted with said particles, said automatic controlling means being responsive to the level of said mixture in said supply zone.

3. The apparatus for mixing solid dry particles with a wetting agent of claim 1, further characterized in that said means for wetting said particles includes means for directing streams of said wetting agent at said particles such that said streams form a plurality of planes which intersect each other along a plurality of lines, said lines intersecting the path of said particles free-falling from said feeding means causing the wetting of said particles.

4. The apparatus for mixing solid dry particles with a wetting agent of claim 1, further characterized in that said means for wetting said particles includes means for directing said streams of said wetting agent such that said streams form a first plane and a second plane, the intersection of said first plane and said second plane forming a line which intersects the path of said particles free-falling from said feeding means causing the wetting of said particles.

5. The apparatus for mixing solid dry particles with a wetting agent of claim 1, further characterized in that said means for wetting said particles includes means for directing said streams of said wetting agent such that said streams form a first plane and a second plane and the corresponding streams of said first plane and said second plane intersect each other along a line of intersection points, said line intersecting the path of said particles free-falling from said feeding means causing the wetting of said particles.

6. The apparatus for mixing solid dry particles with a wetting agent of claim 1, further characterized in that said means for wetting said particles includes primary means for directing primary streams of said wetting agent such that said primary streams form a first plane and a second plane, the intersection of said first plane and said second plane forming a line which intersects the path of said particles free-falling from said feeding means causing the wetting of said particles; and auxiliary means for directing auxiliary streams of said wetting agent such that said auxiliary streams form a first plane and a second plane and the corresponding auxiliary streams of said first plane and said second plane intersect each other along the same line of intersection as the line of intersection of said first plane and said second plane formed by said primary streams of said wetting agent, said line intersecting the path of said particles free-falling from said feeding means causing the wetting of said particles.

7. The apparatus for wetting and mixing solid dry particles with a wetting agent of claim 6, further characterized in that said primary means for directing primary streams of said wetting agent are located above said auxiliary means for directing auxiliary streams of said wetting agent so as to minimize atomization in the upper region of said wetting zone caused by the intersection of said corresponding auxiliary streams with each other.

8. The apparatus for mixing solid dry particles with a wetting agent of claim 1, further characterized in that said means for feeding includes means for storing said particles in a storage zone, said storage zone having an aperture;

means for vibrating said particles in said storage zone so as to discharge said particles through said aperture; and means for guiding said discharged particles out of said aperture at a uniform rate such that each of said discharged particles free-falls from said guiding means at substantially the same horizontal velocity.

9. The apparatus for mixing solid dry particles with a wetting agent of claim 1, further characterized in that said means for mixing said wetted particles in said mixing zone includes auxiliary mechanical mixing means, said auxiliary mechanical mixing means including means for agitating said mixture in said mixing zone; and means for connecting said agitation means to an agitation source means located remotely from said mixing zone.

10. A method for wetting individual solid dry particles with a wetting agent, which comprises, feeding said particles at a uniform rate from a storage zone so that said particles are discharged from said storage zone into a wetting zone by free-fall from said storage zone;

wetting said particles in said wetting zone by directing streams of said wetting agent at said particles to separate said particles from each other and permit said wetted particles to free-fall into a mixing zone;

mixing said wetted particles with said wetting agent into a mixture in said mixing zone;

transferring said mixture from said mixing zone into an aging zone and then into a supply zone; and automatically controlling the quantity of said particles fed into said mixing zone simultaneously with the quantity of said wetting agent being wetted with said particles.

* * * * *